(12) United States Patent
Nam et al.

(10) Patent No.: US 12,269,983 B2
(45) Date of Patent: Apr. 8, 2025

(54) SPHERICAL INORGANIC PARTICLES HAVING SURFACE BUMPS FORMED THEREON, AND METHOD OF MANUFACTURING SAME

(71) Applicants: BEAD ORIGIN INC., Gyeonggi-do (KR); Research & Business Foundation SUNGKYUNKWAN UNIVERSITY, Gyeonggi-do (KR)

(72) Inventors: Jae-Do Nam, Seoul (KR); Na-Yeon Kim, Seoul (KR); In-Kyung Park, Seoul (KR); Uiseouk Hwang, Seoul (KR); Donghak Kim, Busan (KR)

(73) Assignees: BEAD ORIGIN INC., Gyeonggi-do (KR); Research & Business Foundation SUNGKYUNKWAN UNIVERSITY, Gyeonggi-do (KR)

( * ) Notice: Subject to any disclaimer, the term of this patent is extended or adjusted under 35 U.S.C. 154(b) by 717 days.

(21) Appl. No.: 17/611,806

(22) PCT Filed: Feb. 26, 2021

(86) PCT No.: PCT/KR2021/002502
§ 371 (c)(1),
(2) Date: Nov. 16, 2021

(87) PCT Pub. No.: WO2021/172954
PCT Pub. Date: Sep. 2, 2021

(65) Prior Publication Data
US 2022/0235252 A1 Jul. 28, 2022

(30) Foreign Application Priority Data
Feb. 27, 2020 (KR) .................. 10-2020-0023993

(51) Int. Cl.
*C09K 3/14* (2006.01)
*C01F 17/235* (2020.01)
(Continued)

(52) U.S. Cl.
CPC .......... *C09K 3/1409* (2013.01); *C01F 17/235* (2020.01); *C09G 1/02* (2013.01);
(Continued)

(58) Field of Classification Search
CPC . C01F 17/235; C09G 1/02; C09G 1/04; C01P 2002/04; C01P 2002/85;
(Continued)

(56) References Cited

U.S. PATENT DOCUMENTS 4,859,432 A    8/1989  David et al.
4,965,057 A * 10/1990  David .................. B82Y 30/00
423/263

(Continued)

FOREIGN PATENT DOCUMENTS

CN      1391531 A    1/2003
CN    101284952 A   10/2008
(Continued)

OTHER PUBLICATIONS

Zhang et al., "Controllable synthesis of spherical cerium oxide particles", RCS Advances, vol. 6, p. 30956-30962, (2016).
(Continued)

*Primary Examiner* — Shuangyi Abu Ali
(74) *Attorney, Agent, or Firm* — Christensen, Fonder, Dardi PLLC; Diane E. Bennett; Peter S. Dardi

(57) ABSTRACT

The inorganic particle according to the present invention is composed of aggregation of crystalline and amorphous small particles and has a spherical and smooth surface. The spherical appearance, low crystallinity and narrow particle size distribution of inorganic particle are more advantageous (Continued)

$Ce^{3+}$     $Ce^{4+}$     $O^{2-}$ in reducing scratch defects in the CMP process. In addition, since the small particles on the surface of the inorganic particle provide more active sites, the inorganic particle has an excellent removal rate, so it is advantageous as a next-generation CMP abrasive.

12 Claims, 10 Drawing Sheets

(51) Int. Cl.
    *C09G 1/02*          (2006.01)
    *C09G 1/04*          (2006.01)

(52) U.S. Cl.
    CPC .............. *C09G 1/04* (2013.01); *C09K 3/1463* (2013.01); *C01P 2002/04* (2013.01); *C01P 2002/85* (2013.01); *C01P 2004/60* (2013.01); *C01P 2006/10* (2013.01); *C01P 2006/40* (2013.01)

(58) Field of Classification Search
    CPC .............. C01P 2004/60; C01P 2006/10; C01P 2006/40; C09K 3/1409; C09K 3/1436; C09K 3/1463
    See application file for complete search history.

(56) References Cited

U.S. PATENT DOCUMENTS

| | | |
|---|---|---|
| 6,262,129 B1 | 7/2001 | Murray et al. |
| 6,866,925 B1 | 3/2005 | Chane-Ching |
| 2004/0020132 A1 | 2/2004 | Yokoi |
| 2006/0156635 A1 | 7/2006 | Kim et al. |
| 2007/0084134 A1 | 4/2007 | Wang et al. |
| 2008/0086951 A1 | 4/2008 | Wakamiya et al. |
| 2012/0000137 A1 | 1/2012 | Choi et al. |
| 2015/0132479 A1 | 5/2015 | Arfsten et al. |
| 2016/0318804 A1 | 11/2016 | Cho et al. |
| 2017/0096584 A1 | 4/2017 | Nojima |
| 2018/0105428 A1 | 4/2018 | Tawarazako et al. |
| 2018/0186638 A1 | 7/2018 | Enomura et al. |

FOREIGN PATENT DOCUMENTS

| | | |
|---|---|---|
| CN | 101370896 A | 2/2009 |
| CN | 101649182 A | 2/2010 |
| CN | 102884002 A | 1/2013 |
| CN | 103461147 A | 3/2014 |
| CN | 104334269 A | 2/2015 |
| CN | 105948097 A | 9/2016 |
| CN | 105948098 A | 9/2016 |
| CN | 106103637 A | 11/2016 |
| CN | 106145177 A | 11/2016 |
| CN | 106587131 A | 4/2017 |
| CN | 107428544 A | 12/2017 |
| CN | 107848836 A | 3/2018 |
| CN | 108249468 A | 7/2018 |
| EP | 3632848 A1 | 5/2018 |
| JP | 63-239109 A | 10/1988 |
| JP | 64-52610 A | 2/1989 |
| JP | 2006-110405 A | 4/2006 |
| JP | 2008-169102 A | 7/2008 |
| KR | 10-2000-0011546 A | 2/2000 |
| KR | 10-2003-0072549 A | 9/2003 |
| KR | 10-2004-0080935 A | 9/2004 |
| KR | 10-2010-0032718 A | 3/2010 |
| KR | 10-2011-0057876 A | 6/2011 |
| KR | 10-2015-0013558 A | 2/2015 |
| KR | 10-1492234 B1 | 2/2015 |
| KR | 10-2015-0093999 A | 8/2015 |
| KR | 10-2019-0058715 A | 5/2019 |
| KR | 10-2019-0141741 A | 11/2019 |
| TW | 167467 B | 9/1991 |
| TW | 2008-31407 A | 8/2008 |
| WO | 02-42201 A1 | 5/2002 |
| WO | 2009-040597 A1 | 4/2009 |
| WO | 2016-156167 A1 | 10/2016 |

OTHER PUBLICATIONS

Zhou et al., "CeO2 Spherical Crystallites: Synthesis, Formation Mechanism, Size Control, and Electrochemical Property Study", J. Phys. Chem. C, vol. 111, p. 1651-1657, (2007).

Office Action from corresponding Japanese Patent Application No. 2021-568911 dated Dec. 20, 2020.

Search Report from corresponding European Patent Application No. 21760538.5 dated Nov. 24, 2022.

Office Action from corresponding Chinese Patent Application No. 202180003490.9 dated Mar. 18, 2022.

Office Action from corresponding Taiwan Patent Application No. 110107037 dated Apr. 29, 2022.

Iulianelli et al., "Influence of TiO2 nanoparticle on the thermal, morphological and molecular characteristics of PHB matrix", Elsevier, Polymer Testing, vol. 65, p. 156-162, (2018).

Monshi et al., "Modified Scherrer Equation to Estimate More Accurately Nano-Crystallite Size Using XRD", World Journal of Nano Science and Engineering, p. 154-160, (2012).

Thromat et al., "Formation of the Ce/Y2O3 Interface: an in situ XPS Study", Elsevier, Surface Science, vol. 345, p. 290-302, (1996).

Van den Brand et al., "Correlation between hydroxyl fraction and O/Al atomic ratio as determined from XPS spectra of aluminium oxide layers", Surface and Interface Analysis, vol. 36, p. 81-86, (2004).

Zhang et al., "Visible-light induced oxo-bridged ZrIV—O-CeIII redox centre in tetragonal ZrO2—CeO2 solid solution for degradation of organic pollutants", Phys. Chem. Chem. Phys., vol. 13, p. 3896-3905, (2011).

International Search Report for Patent Application No. PCT/KR2021/002502 dated Jun. 14, 2021.

Office Action from corresponding Korean Patent Application No. 10-2020-0023993 dated Feb. 8, 2021.

* cited by examiner

SPHERICAL INORGANIC PARTICLES HAVING SURFACE BUMPS FORMED THEREON, AND METHOD OF MANUFACTURING SAME

TECHNICAL FIELD

This application is a National Stage filing of PCT Application No. PCT/KR2021/002502 filed Feb. 26, 2021, entitled "Spherical Inorganic Particles Having Surface Bumps Formed Thereon, and Method Of Manufacturing Same," which claims the benefit of priority from Korean Patent Application No. 10-2020-0023993, filed on Feb. 27, 2020, the entire disclosure of which is incorporated by reference herein.

The present invention relates to a spherical inorganic particle with surface protrusion and a method for manufacturing the same, and more particularly, to a spherical inorganic particle with surface protrusion and controlled surface charge, and a method for manufacturing the same.

BACKGROUND ART

Inorganic particles are used as raw materials or final products in various fields, and in particular, they are utilized in a wide range of chemical catalysts, biotechnology, semiconductor processing, and glass tempering.

The process of synthesizing these inorganic particles is very diverse. The synthesis method is divided into a method of assembling atoms (bottom up) and a method of reducing the size of a large mass (top down) according to the manufacturing approach, and it is divided into a physical, mechanical and chemical method according to the synthesis principle. Among chemical methods, the liquid-phase reaction method using a chemical reaction in the liquid phase is the most widely used method for synthesizing ceramic raw material powder. The types of powder manufacturing process using liquid-phase chemical reaction include a sol-gel method, a pyrolysis method, a polymerized complex method, a precipitation method, a hydrothermal method, etc. are known.

In the process of synthesizing inorganic particles, the particles grow according to the intrinsic assembly characteristics of atoms, and accordingly, the final shape of the inorganic particles is determined. That is, since the shape of the inorganic particle is an inherent property of the inorganic particle, it is very difficult to prepare the inorganic particles having the same component in different shapes.

For example, a ceria ($CeO_2$) crystal has a fluorite particle shape with an angled hexagonal structure. Ceria particles are included as abrasive particles in the slurry used in the CMP process of semiconductor device manufacturing, but scratch defects occur due to the angled structure of the ceria particles. Therefore, in order to solve this problem, a method for preparing ceria particles in a spherical shape has been studied. However, it is very difficult to synthesize ceria particles having uniform size and good dispersibility while changing the shape of ceria having an angled fluorite structure to a spherical shape.

In addition, depending on the shape change of the inorganic particle, the specific surface area of the particle tends to vary, and correspondingly, the degree of chemical reaction on the surface of the particle may also vary. For example, when inorganic particles are used as catalysts, the specific surface area of the particles is directly related to the catalytic active site, and the reactivity of particles having a large specific surface area relative to the same volume is excellent.

Another issue of inorganic particles is dispersion stability. Nano-sized inorganic particles (hereinafter, also referred to as 'nanoparticles') are generally thermodynamically unstable in an aqueous solution and have difficulties in that they are not stably dispersed due to their high specific surface area. Therefore, there is a problem that agglomeration of the particles may occur during storage, thereby causing change of the shape or properties of the particle. Therefore, there is a need for a method for improving the dispersibility of nanoparticles.

Accordingly, in order to improve the dispersibility of nanoparticles, a technique for controlling the surface charge of nanoparticles is required. In particular, for example, dispersion in an aqueous solution of ceria or silica nanoparticles used as abrasive particles in a slurry in a semiconductor CMP process is very important. Therefore, there is an effort to improve the efficiency of the polishing process by adjusting the pH of the aqueous slurry solution to provide an environment capable of generating a stronger attraction between the abrasive particles and the film.

DETAILED DESCRIPTION OF THE INVENTION

Technical Problem

The problem to be solved by the present invention is to provide an inorganic particle having a spherical shape, not an angled shape, and excellent water dispersibility, excellent polishing ability and low scratch damage for a silicon film, particularly.

Another problem to be solved by the present invention is to provide a method for manufacturing the inorganic particle.

In addition, yet another problem to be solved by the present invention is to provide a dispersion in which the inorganic particles are dispersed in water.

Solution to Problem

In order to achieve the above-described technical problems, the present invention provides an inorganic particle formed by aggregation of a plurality of small particles, wherein the small particle has a mixed phase of a crystalline phase and an amorphous phase and has a degree of crystallinity of 90% or less.

According to one embodiment, the small particle may have a particle diameter of 10 nm or less.

According to one embodiment, the inorganic particle may have a density of 3.0 to 5.0 g/ml, an average particle diameter of 30 to 1000 nm, and a standard deviation of the particle diameter of 20 or less. According to one embodiment, the inorganic particle may have an isoelectric point of pH 5 to 7.

According to one embodiment, the inorganic particle may have a zeta potential of +30 to +50 mV or −30 to −50 mV in an aqueous dispersion of pH 4.

According to one embodiment, the inorganic particle may be composed of an oxide of one or more elements selected from the group consisting of Ga, Sn, As, Sb, Ce, Si, Al, Co, Fe, Li, Mn, Ba, Ti, Sr, V, Zn, La, Hf, Ni and Zr.

According to one embodiment, the inorganic particle may be $CeO_2$ particle wherein the ratio of $Ce^{3+}/Ce^{4+}$ is 40 to 60.

In addition, in order to solve the above-described technical problems, the present invention provides a method comprising:

(a) dissolving a self-assembling surfactant in a solvent;

(b) dissolving or dispersing an inorganic precursor in the solvent before, after, or simultaneously with the step (a) to prepare an inorganic precursor solution; and (c) forming small particles having a mixed phase of a crystalline phase and an amorphous phase in the shell formed by the surfactant through the self-assembly reaction of the inorganic precursor and the surfactant, and then forming an inorganic particle by aggregation of a plurality of the small particles.

According to one embodiment, the self-assembling surfactant is at least one selected from a cationic surfactant, an anionic surfactant and an amphoteric surfactant having a charge capable of ionically bonding with the inorganic precursor, which has a functional group that allows a condensation reaction or crosslinking reaction.

According to one embodiment, the functional group that allows a condensation reaction or crosslinking reaction may be at least one selected from the group consisting of an amide group, a nitro group, an aldehyde group, and a carbonyl group.

According to one embodiment, the self-assembling surfactant may be a polymer of the following formula 1.

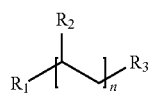

[Formula 1]

In the formula 1, $R_1$ and $R_3$ are independently a hydrogen atom, a $C_1$-$C_{10}$ alkyl group or a $C_1$-$C_{10}$ alkoxy group, $R_2$ is a substituent of formula 2 below, and n is 2 or more.

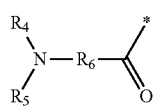

[Formula 2]

In the formula 2, $R_4$ and $R_5$ are independently a hydrogen atom, a $C_1$-$C_{10}$ alkyl group or a $C_1$-$C_{10}$ alkoxy group, $R_6$ is a $C_1$-$C_{10}$ alkylene group or a single covalent bond, and * represents a connection site.

According to one embodiment, the method may comprise treating the inorganic particle obtained in the step (c) with an acid and a base to obtain the inorganic particle having a controlled surface charge.

According to one embodiment, the solvent may be water or a mixed solvent of water and a solvent having compatibility with water.

According to one embodiment, the solvent having compatibility with water may be at least one selected from alcohol, chloroform, ethylene glycol, propylene glycol, diethylene glycol, glycerol, and butyl glycol.

In addition, according to the present invention, there is provided an aqueous dispersion in which the inorganic particles are dispersed in water.

According to one embodiment, the aqueous dispersion may be a slurry for CMP.

Effect of the Invention

The inorganic particle according to the present invention is an inorganic particle formed by aggregation of a plurality of small particles, wherein the small particle has a mixed phase of a crystalline phase and an amorphous phase and has a degree of crystallinity of 90% or less, and having a shape with surface protrusions formed by the small particles, thereby providing a large specific surface area and facilitating control of the surface charge according to pH control. As a result, the particle has the increased contact area with the silicon film, the improved polishing rate, and the reduced scratch damage, so the polishing efficiency is excellent when used as abrasive particles in the CMP polishing slurry.

BEST MODE FOR CARRYING OUT THE INVENTION

Figure 1:
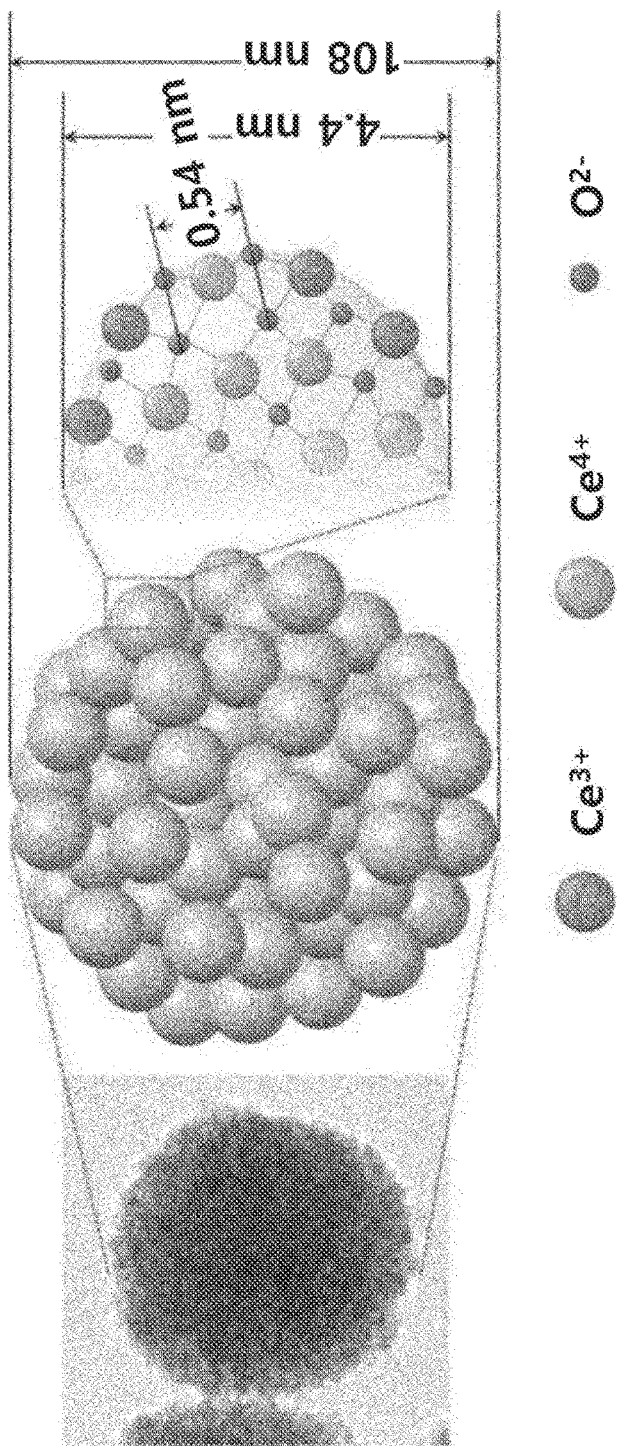
FIG. 1 schematically shows the shape of an inorganic particle according to the present invention.

Hereinafter, the present invention will be described in more detail with reference to various embodiments.

However, this is not intended to limit the present invention to specific embodiments, and it should be understood that all modifications, equivalents or substitutes included in the spirit and scope of the present invention are included.

Terms such as first, second, A, and B may be used to describe various components, but the components are not limited by the terms, and the terms are used only for the purpose of distinguishing one component from other components.

The term "and/or" includes any one or any combination of a plurality of recited items.

When a component is referred to as being "connected" or "contacted" to another component, it should be understood that it may be connected or contacted to another component directly or with other component interposed therebetween.

The singular expression includes the plural expression unless otherwise specified.

Terms such as "comprising", "including" or "having" refer to the presence of a feature, number, step, operation, component, part, or combination thereof described in the specification, and do not exclude the possibility that other features, figures, steps, operations, components, parts, or combinations thereof not mentioned herein may exist or be added.

According to the present invention, by reacting self-assembling surfactants with inorganic precursors in an aqueous solvent, it is possible to synthesize inorganic particles having other particle shape than the particle shape corresponding to the intrinsic atomic assembly characteristics of the inorganic material. For example, it is possible to form ceria ($CeO_2$) inorganic particles, which are inevitably formed in an angled fluorite hexagonal structure according to their unique atomic assembly characteristics, into spherical particles having protrusions.

According to the present invention, an inorganic particle is formed by aggregation of a plurality of small particles having a mixed-phase of a crystalline phase and an amorphous phase and having a degree of crystallinity of 90% or less. While the degree of crystallinity is a degree of crystallinity of small particles, it can also be referred to as a degree of crystallinity of the inorganic particle because the small particles are aggregated to form the inorganic particle in the form of nanocluster. The degree of crystallinity also refers to the proportion of the crystalline phase among the total phases. That is, the degree of crystallinity of 90% or less means that the crystalline phase occupies 90% or less and the amorphous phase occupies 10% or more. The degree of crystallinity of the small particle or inorganic particle may be 90% or less, 85% or less, 80% or less, or 75% or less, and 50% or more, 60% or more, 65% or more, or 70% or more.

Since the crystalline phase and the amorphous phase coexist in a certain ratio in the particles, the occurrence of defects such as scratches and dishing of the substrate can be minimized when the particles are used as a polishing slurry for the CMP process.

FIG. 1 schematically shows the structure of an inorganic particle according to the present invention. That is, the inorganic particle according to the present invention is composed of aggregation of tiny, small particles, wherein the small particle has a mixed-phase of a crystalline phase and an amorphous phase to form surface protrusions and thus provides very unique surface properties.

As shown in FIG. 1, both of inorganic particle and small particle are substantially spherical. Here, the term spherical means that an aspect ratio expressed by the ratio of the minor diameter/major diameter is 0.8 or more, 0.9 or more, or 0.95 or more, and 1.2 or less, 1.1 or less, or 1.05 or less. Therefore, the inorganic particle according to the present invention is hereinafter also referred to as a "spherical protrusion inorganic particle" or "spherical protrusion particle".

Since the inorganic particle has spherical protrusions on the surface, there is an effect that the specific surface area of the particle relative to the same mass can be increased. The diameter of the small particle forming the spherical protrusion is 2 to 25% of the diameter of the inorganic particle, preferably 5% or more, 10% or more, 1.5% or more, or 20% or more. The particle diameter of the small particle may be 10 nm or less, 8 nm or less, 6 nm or less, or 5 nm or less and 1 nm or more, 2 nm or more, 3 nm or more, or 4 nm or more.

The spherical protrusion inorganic particle according to the present invention have a particle size distribution of 30 to 1000 nm and has a uniform size. The size of the spherical protrusion inorganic particle is based on the number average particle diameter, and may be preferably 50 nm or more, 100 nm or more, 110 nm or more, or 120 nm or more, and 800 nm or less, 500 nm or less, 300 nm or less, 200 nm or less, or 150 nm or less. The standard deviation of the particle size of the inorganic particle may be 20 or less, 18 or less, 16 or less, 14 or less, 12 or less, or 11 or less.

FIG. 1 schematically shows the structure of a ceria particle prepared according to Example 1 of the present invention, where $CeO_2$ atomic units (size 0.54 nm) cluster to form a small particle (particle diameter 4.4 nm), and the small particles cluster to form a ceria particle (particle diameter 108 nm).

The spherical protrusion inorganic particle according to the present invention can be prepared by self-assembling a surfactant and an inorganic precursor, and as a result, the inorganic particle according to the present invention may have a density of 3.0 to 5.0 g/ml. Density can be measured by TAP densitometry (ASTM B527). The density of the inorganic particle may be 3.2 g/ml or more, 3.3 g/ml or more, 3.4 g/ml or more, or 3.5 g/ml or more, and 4.5 g/ml or less or 4.0 g/ml or less.

According to one embodiment, the primary particles and the secondary particles are each independently composed of an oxide of one or more elements selected from the group consisting of Ga, Sn, As, Sb, Ce, Si, Al, Co, Fe, Li, Mn, Ba, Ti, Sr, V, Zn, La, Hf, Ni and Zr. According to a preferred embodiment, an oxide of one or more elements selected from cerium (Ce), silicon (Si) and aluminum (Al) may be used. According to a preferred embodiment, the inorganic particle may be composed of ceria ($CeO_2$).

According to one embodiment, the spherical protrusion inorganic particle may have a surface charge of +30 mV or more, or −30 mV or less in an aqueous dispersion at least once, and in particular, it may exhibit a high absolute value of surface charge (zeta potential) of +30~+50 mV or −30~ to −50 mV at pH 4. Here, the term 'surface charge' is used in the same sense as 'zeta potential'.

In addition, according to an embodiment of the present invention, the isoelectric point of the inorganic particle may be pH 5~7. Preferably, the isoelectric point may be pH 5.5 or more and 6.5 or less. The lower the isoelectric point in the aqueous system, the more OH— groups exist on the particle surface, which means that there are many active sites on the particle surface, which is advantageous in improving the polishing performance in the CMP process.

The present invention also provides an aqueous dispersion in which the above-mentioned inorganic particles are dispersed in water.

If the inorganic particles according to the present invention are used as abrasive particles in the slurry in the semiconductor CMP process, the scratch defects can be compensated for because they are spherical without sharp angles with containing an amorphous phase, and the specific surface area increases due to numerous protrusions on the surface of the particle, which increases the probability of contact with the film to be polished, and the polishing rate can be improved due to the change in the surface properties of the particles. For example, in the case of spherical ceria particles produced by the method presented in the present invention, Ce (III) increases compared to the conventional hexagonal fluorite ceria particle due to elemental defects on the particle surface, thereby improving the polishing rate.

The ceria particle prepared according to the present invention may have the ratio of $Ce^{3+}/Ce^{4+}$ of 40 to 60. The higher the ratio of $Ce^{3+}/Ce^{4+}$, the higher the polishing rate. According to the present invention, the ion ratio of 40 or more, 42 or more, 44 or more, or 46 or more can be achieved. The ion ratio may be 60 or less, 55 or less, or 50 or less.

In addition, according to the method for controlling the surface charge of inorganic particle through pH adjustment presented in the present invention, it is possible to more easily control the surface charge of the spherical protrusion inorganic particle. In addition, a pH environment of an aqueous solution that can provide an optimal interaction between abrasive particles and the film in the CMP process can be used for more efficient and stable polishing.

Hereinafter, a method for manufacturing the spherical protrusion inorganic particle using the liquid phase synthesis method according to the present invention will be described in more detail.

Method for Manufacturing Spherical Protrusion Inorganic Particle Using Liquid-Phase Synthesis Method The spherical protrusion inorganic particle according to the present invention may be manufactured by a method comprising the following steps.

(a) dissolving a self-assembling surfactant in a solvent;

(b) dissolving or dispersing an inorganic precursor in the solvent before, after, or simultaneously with the step (a) to prepare an inorganic precursor solution; and (c) forming small particles having a mixed phase of a crystalline phase and an amorphous phase in the shell formed by the surfactant through the self-assembly reaction of the inorganic precursor and the surfactant, and then forming an inorganic particle by aggregation of a plurality of the small particles.

In the method for manufacturing spherical protrusion inorganic particle using the liquid-phase synthesis method of the present invention, the step (c) of the particle formation comprises (i) forming small particles while reducing the inorganic precursor with the self-assembling surfactant; and (ii) aggregating a plurality of small particles as proceeding the self-assembly reaction of the self-assembling surfactant, thereby growing into a spherical inorganic particle having protrusions on the surface. Although the two steps of inorganic particle formation and surface protrusion formation have been described separately, it can also be seen that the spherical protrusion inorganic particle is formed by a single synthesis step because the reactions occur continuously.

Inorganic Precursor

First, a precursor solution of an inorganic material to be prepared is prepared. The solution is prepared by mixing an inorganic precursor, a self-assembling surfactant, and a solvent. The surfactant may be first dissolved in the solvent and then the inorganic precursor may be added and mixed, or the inorganic precursor may be first dissolved in the solvent and then the surfactant may be added and mixed. Alternatively, the inorganic precursor and the self-assembling surfactant may be simultaneously added to the solvent and mixed. In this process, a weak bond is formed between the inorganic precursor and the surfactant.

Here, the inorganic precursor is a material capable of forming an oxide, which contains one or elements selected from the group consisting of Ga, Sn, As, Sb, Ce, Si, Al, Co, Fe, Li, Mn, Ba, Ti, Sr, V, Zn, La, Hf, Ni and Zr. It is preferable that the inorganic precursor used in the present invention is a compound capable of ionically bonding with the charged surfactant in an aqueous solution state. For example, it may be nitrate, bromide, carbonate, chloride, fluoride, hydroxide, iodide, oxalate or sulfate, which may be in the form of a hydrate or anhydride.

More specifically, for example, a cerium-containing salt may be used, for example ammonium cerium(IV) nitrate, cerium(III) bromide anhydrous, cerium(III) carbonate hydrate, cerium(III) chloride anhydrous, cerium(III) chloride heptahydrate, cerium(III) fluoride anhydrous, cerium (IV) fluoride, cerium(IV) hydroxide, cerium(III) iodide anhydrous, cerium(III) nitrate hexahydrate, cerium(III) oxalate hydrate, cerium(III) sulfate, cerium(III) sulfate hydrate, cerium(III) sulfate octahydrate and cerium(IV) sulfate hydrate.

Alternatively, silicon precursors such as tetraethyl orthosilicate (TEOS), diethoxydimethylsilane (DEMS) and vinyltriethoxysilane (VIES), titanium precursors having a structure of $Ti(OR)_4$, zirconium precursors having a structure of $Zr(OR)_4$, aluminum precursors having a structure of $Al(OR)_4$ may be used. Here, R denotes a functional group that can be hydrated or alcoholized with water or alcohol, for example, a lower alkyl group such as a methyl group or an ethyl group. In addition, it is also possible to use a precursor capable of forming an oxide of Ga, Sn, As, Sb, Mn, or V.

Self-Assembling Surfactant

Surfactants that are capable of self-assembling include anionic, cationic, and amphoteric surfactants which have a functional group capable of combining with the inorganic precursor, having a (+) charge, a (−) charge or both charges when dissolved in a solvent and inducing a particle formation by a crosslinking reaction. Examples of the functional group include an amide group, a nitro group, an aldehyde group, and a carbonyl group.

According to the present invention, it is possible to prepare particles having different surface charges depending on the type of the self-assembling surfactant used in the synthesis reaction. That is, the self-assembling surfactant can be selectively used according to the surface charge of the inorganic particle to be synthesized. For example, a cationic surfactant can be used when preparing spherical inorganic particles having a (−) charge. The positively (+) charged site of the cationic surfactant combines with the ion of the inorganic precursor to form small particles, and as the reaction proceeds, a self-assembled shell is formed, in which inorganic particles grow in a spherical shape with protrusions on the surface. According to the same principle, on the contrary, an anionic surfactant can be used when preparing spherical inorganic particles having a (+) charge. As such, in order to prepare inorganic particles having a target surface charge, a surfactant shell having a specific Tonicity is required, and it is possible to manufacture particles having a different surface charge according to the type of the self-assembling surfactant used.

In addition, if necessary, one or more surfactants may be mixed and used during the synthesis process. Among the self-assembling materials, surfactants can form crosslinking with each other while being dissolved in a solvent and can be self-assembled as the reaction proceeds at a certain temperature and over a certain time. At this time, the distance between the small particles bound to the surfactant becomes closer, resulting in aggregation of the particles to grow up the particles. As the particles grow surrounded by the shell of the self-assembled surfactant, the inorganic particle is formed into a solid spherical particle, and at the same time numerous protrusions are formed on its surface. The protrusions may grow simultaneously on the surface of the spherical particle, or the protrusions may grow independently and be exposed on the surface of the spherical particle.

As the anionic surfactant, alkylbenzene sulfonates, alkyl sulfates, alkyl ether sulfates, soaps, etc. may be used.

As the cationic surfactant, an alkyl quaternary nitrogen compound, a quaternary ammonium compound such as Esterquats may be used.

Also, an amphoteric surfactant containing both of a cationic quaternary ammonium ion group and an anionic carboxylate (—COO⁻) sulfate (—SO₄²⁻) or sulfonate (—SO₃⁻) group may be used.

In addition, picolinic acid, (carboxymethyl)dimethyl-3-[(1-oxododecyl)amino]propylammonium hydroxide, laurel betaine, betaine citrate, sodium lauroamphoacetate, sodium hydroxymethylglycinate, (carboxymethyl)dimethyloleylammonium hydroxide, cocamidopropyl betaine, (carboxylate methyl)dimethyl(octadecyl)ammonium, PEO-PPO block copolymer, anionic siloxanes and dendrimers, poly(sodium 10-undecylenate), poly(sodium 10-undecenylsulfate), poly (sodium undeconylvalinate), polyvinylpyrrolidone, polyvinylalcohol, 2-acrylamide-2-methyl-1-propanesulfonic acid, alkyl methacrylamide, alkyl acrylate, poly(allylamine)-supported phases, poly(ethyleneimine), poly(N-isopropylacrylamide), n-hydroxysuccinimide, etc. may be used.

Preferably, the self-assembling surfactant may be a polymer of the following formula 1. In addition, the polymer of the following formula 1 may be an amphoteric surfactant having both (+) and (−) charges in the molecule.

[Formula 1]

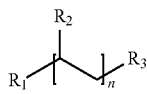

In the formula 1, $R_1$ and $R_3$ are independently a hydrogen atom, a $C_1$-$C_{10}$ alkyl group or a $C_1$-$C_{10}$ alkoxy group, $R_2$ is a substituent of formula 2 below, and n is 2 or more.

[Formula 2]

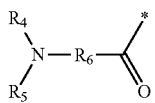

In the formula 2, $R_4$ and $R_5$ are independently a hydrogen atom, a $C_1$-$C_{10}$ alkyl group or a $C_1$-$C_{10}$ alkoxy group, $R_6$ is a $C_1$-$C_{10}$ alkylene group or a single covalent bond, and * represents a connection site.

The polymer of the formula. 1 preferably has a molecular weight of 500 or more and 100,000 or less. Here, the molecular weight is a weight average molecular weight, and the weight average molecular weight means a polystyrene equivalent molecular weight measured by the GPC method. The molecular weight may be 1000 or more, 5000 or more, 10,000 or more, 20,000 or more, or 30,000 or more, and 95,000 or less, 90,000 or less, 85,000 or less, 80,000 or less, 70,000 or less, 60,000 or less, 50,000 or less, or 40,000 or less.

The amount of the self-assembling surfactant may be 30 to 150 parts by weight per 100 parts by weight of the inorganic precursor. The amount of the surfactant used may be 40 parts by weight or more, 50 parts by weight or more, 60 parts by weight or more, 70 parts by weight or more, 80 parts by weight or more, or 90 parts by weight or more, and 140 parts by weight or less, 130 parts by weight, 120 parts by weight or less than or 110 parts by weight or less.

Solvent

The solvent used for the synthesis reaction of the spherical protrusion inorganic particle may be water or a mixed solvent of a solvent having compatibility with water and water.

According to one embodiment, the solvent having compatibility with water may be at least one selected from alcohol, chloroform, ethylene glycol, propylene glycol, diethylene glycol, glycerol, and butyl glycol.

When the solvent having compatibility with water is mixed with water, the mixing volume ratio of water:solvent may be 100:50 to 200, or 100:60 to 150, or 100:70 to 120.

When dissolving an inorganic precursor and/or a self-assembling surfactant in a water or a mixture of water and a solvent compatible with water, it is better to use a stirrer and to proceed with the reaction after complete dissolution. If not, the formation of particles having a uniform morphology may be inhibited.

Synthesis Reaction of Spherical Protrusion Inorganic Particle

In synthesizing the spherical protrusion inorganic particle, the previously prepared inorganic precursor solution is introduced into a reactor to perform a synthesis reaction with the self-assembled surfactant. The synthesis of the spherical inorganic particle is carried out at a temperature range of 60~250° C. for 1 to 24 hours, preferably at a temperature range of 70° C. or more, 80° C. or more or 90° C. or more and 220° C. or less, 200° C. or less, 180° C. or less, or 160° C. or less for 2 hours or more, 3 hours or more, or 4 hours or more and 2.0 hours or less, 10 hours or less, or 8 hours or less.

As the reaction proceeds at a certain temperature for a certain period after the self-assembled surfactant is dissolved in a solvent, the self-assembled surfactant is combined with the ion of the inorganic precursor. Here, the term self-assembly means that positively (+) charged moieties and negatively (−) charged moieties of the surfactant are combined to spontaneously form an organized structure or shape. For example, if the surfactant has an amide group of which the nitrogen atom moiety has a (+) charge and the oxygen atom moiety has a (−) charge in the molecular structure, it can form a network structure by itself. At the same time, the distance between the small particles which are dissolved in the solvent together with these self-assembling materials becomes closer, resulting in aggregation of the particles to grow up the particles (nanoclusters are formed). In this process, as the particles grow surrounded by the shell of the surfactant, the spherical particle is formed, and protrusions are formed on the surface of the particle. The protrusions may grow simultaneously on the surface of the spherical particle, or the protrusions may grow independently and be exposed on the surface of the spherical particle.

Surface Charge Control Method of Spherical Inorganic Particle

According to the present invention, the surface charge of the inorganic particle can be controlled by treating the inorganic particle obtained in the synthesis reaction with an acid and/or a base.

The method for controlling the surface charge of the spherical inorganic particle presented in the present invention is basically to control the pH of the aqueous solution containing the particles. For example, in the case that there are positively charged particles in an aqueous solution, as an acidic substance is added, the particles become highly positively charged. Conversely, as a basic substance is added, the surface charge of the particles becomes weakly positive and then will reach neutral point. If excess bases are continuously added, the particles will be negatively charged. Using this principle, it is possible to control the surface charge of the inorganic particle by adjusting the pH of the aqueous solution.

As an acidic pH adjusting agent for lowering the pH of the aqueous solution, one or more acidic substances such as phosphoric acid, hydrochloric acid, nitric acid, and sulfuric acid may be used in combination. As a basic pH adjusting agent for increasing the pH, one or more basic substances such as sodium hydroxide and aqueous ammonia may be used in combination. At this time, accurate measurement of pH can be achieved by uniformly mixing the inside of the aqueous solution using a stirrer during adjustment of pH.

The spherical protrusion inorganic particle according to the present invention has a surface charge of +30 mV or more, or −30 mV or less at least once and has a stable state in the aqueous solution. Thus, it is provided a method for controlling surface charge that can exhibit surface properties more effectively. The resulting particles have excellent bonding strength with various media such as glass and silicone, so they can be used as abrasive particles.

In particular, the inorganic particle according to the present invention may have a surface charge of +30~+50 mV or −30~ to −50 mV in an aqueous solution of pH 4. That is, due to a zeta potential having a high absolute value under a given pH condition, the polishing rate may be further improved. Here, the term 'surface charge' is used in the same sense as 'zeta potential'.

MODE FOR CARRYING OUT THE INVENTION

The configuration and operation of the present invention will be described in more detail through the following examples. However, they are presented as preferred embodiments of the present invention and cannot be construed as limiting the present invention in any sense. In addition, descriptions that can be technically inferred by those skilled in the art will be omitted.

Preparation of Spherical Ceria Particle

Example 1

In 160 ml of a solvent in which ethylene glycol (99%) and water were mixed at a volume ratio of 100:100, 2 g of poly(N-isopropylacrylamide) (Aldrich, Mw: 30,000) as a self-assembling surfactant was added and stirred with a magnetic stirrer. After confirming that it was completely dissolved, 2 g of cerium nitrate hexahydrate ($Ce(NO_3)_3 \cdot 6H_2O$) from Aldrich as a cerium precursor was added and dissolved to prepare a cerium precursor solution.

The cerium precursor solution was put into a liquid phase reactor where the temperature was maintained, and the synthesis reaction was carried out for about 165 minutes in a temperature range of 90 to 140° C. After completion of the reaction, the obtained ceria particle solution was centrifuged at 4000 rpm for 1 hour and 30 minutes using a centrifuge, the precipitate was separated and then washed 3 times with water ($H_2O$) to obtain the resultant ceria particle (hereinafter, also referred to as "BOC100").

Example 2

In an aqueous solution in which 2.4 g of cerium chloride was dissolved in 180 ml of water, 2.4 g of poly(N-isopropylacrylamide) (Aldrich, Mw: 85,000) having a molecular weight different from that used in Example 1 was added and stirred and reacted at 70~90° C. for 6 hours. Thereafter, it was separated and washed in the same manner as in Example 1 above to obtain a ceria particle having spherical projection.

Comparative Example 1

A $CeO_2$ particle having a fluorite hexagonal structure (manufacturer: Solvay, product name: HC60) was prepared.

Comparative Example 2

8 g of cerium nitrate hexahydrate ($Ce(NO_3)_3 \cdot 6H_2O$) from Aldrich as a cerium precursor was added in 160 ml of water and dissolved with stirring using a magnetic stirrer to prepare a cerium precursor solution. After confirming that it was completely dissolved, 4 g of sodium hydroxide (NaOH) was added to prepare a basic solution. It was stirred for about 1 hour to obtain a $CeO_2$ particle synthesized by a precipitation method.

Analysis of Morphology and Structure

The morphology and structure of the ceria particles of Examples 1 and 2 and Comparative Example 1 were analyzed using field emission scanning electron microscopy (FE-SEM, JEOL JSM 7401F), high-resolution transmission electron microscopy (HR-TEM, JEM-2100F), an X-ray diffraction analyzer (Rigaku SmartLab SE X-ray diffractometer with Cu Kα radiation) and X-ray photoelectron spectroscopy (XPS, Thermo ESCALAB 250).

Figure 2:
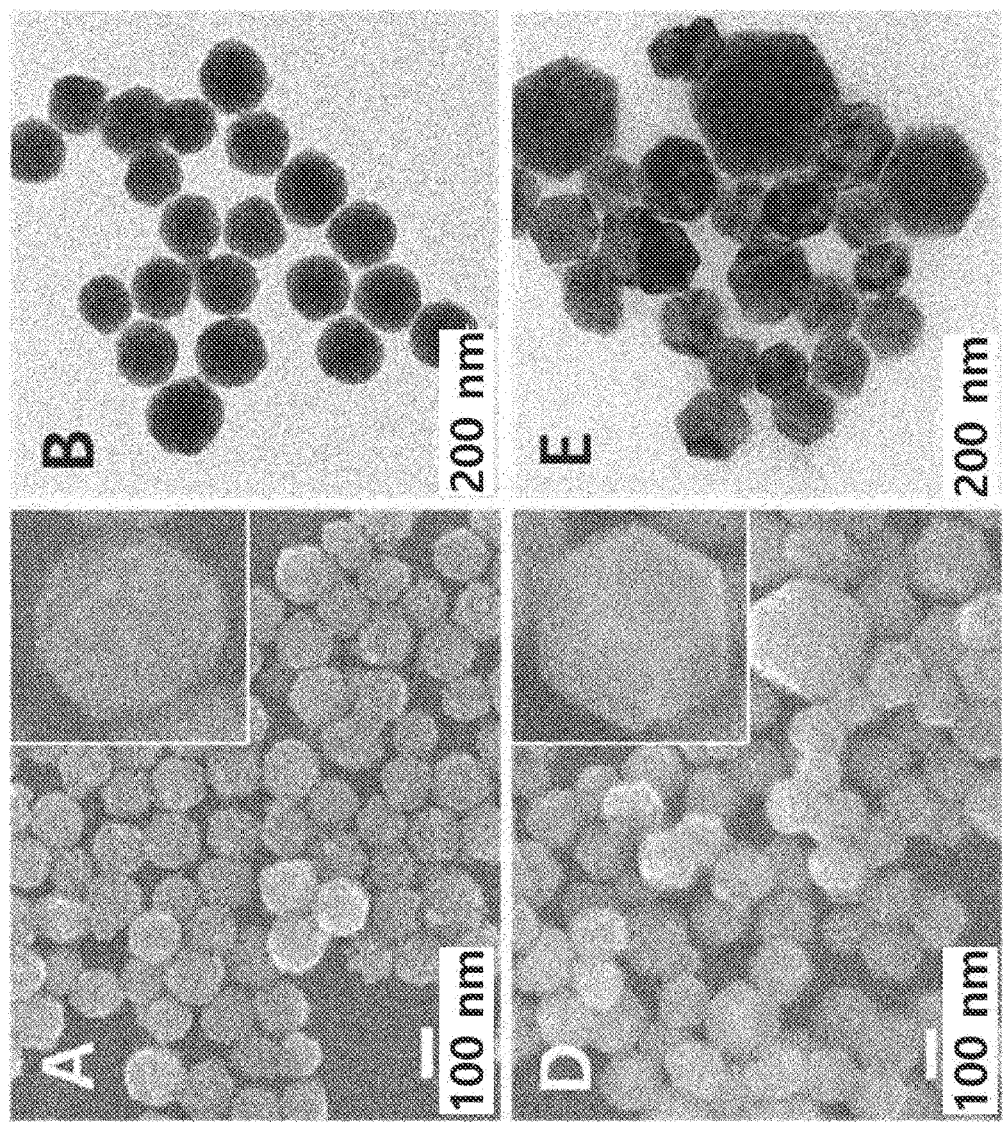
FIG. 2 is scanning electron microscope images and high-resolution transmission electron microscope (HR-TEM) images of $CeO_2$ particles according to Example 1 and Comparative Example 1.

FIGS. 2 (A) and (B) are SEM images and TEM images showing the shape of the ceria particle (BOC100) prepared in Example 1. It is shown that the ceria particle of Example 1 exhibits a spherical shape providing round and smooth surface morphology.

Meanwhile, according to FIGS. 2 (D) and (E), the ceria particle (HC60) of Comparative Example 1 shows a characteristic shape of a fluorite crystal having the pointed edges with sharp angles and crystal lattice planes.

Figure 3:
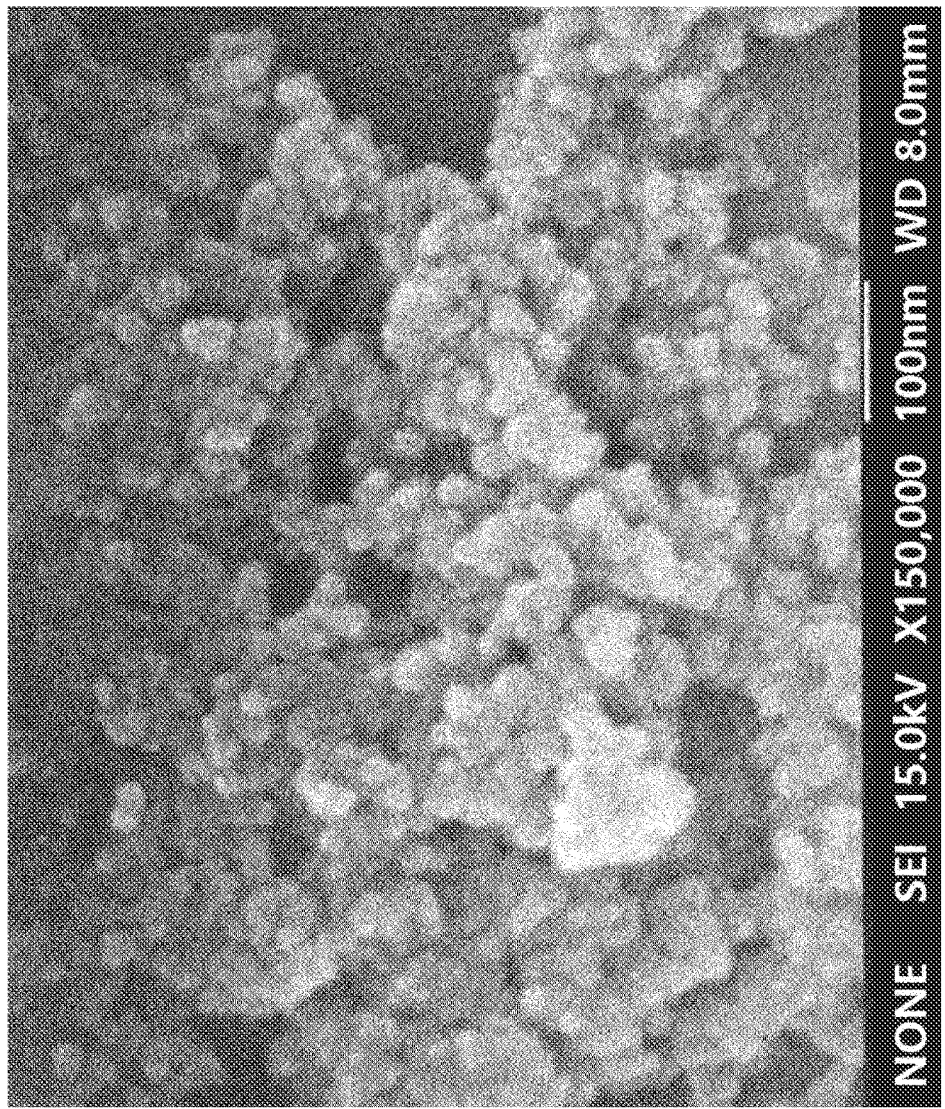
FIG. 3 is a scanning electron microscope image of a sample according to Comparative Example 2.

FIG. 3 is an SEM image of particles prepared by a precipitation method according to Comparative Example 2. It can be seen that the particles have an irregular shape and are agglomerated with each other irregularly.

Figure 4:
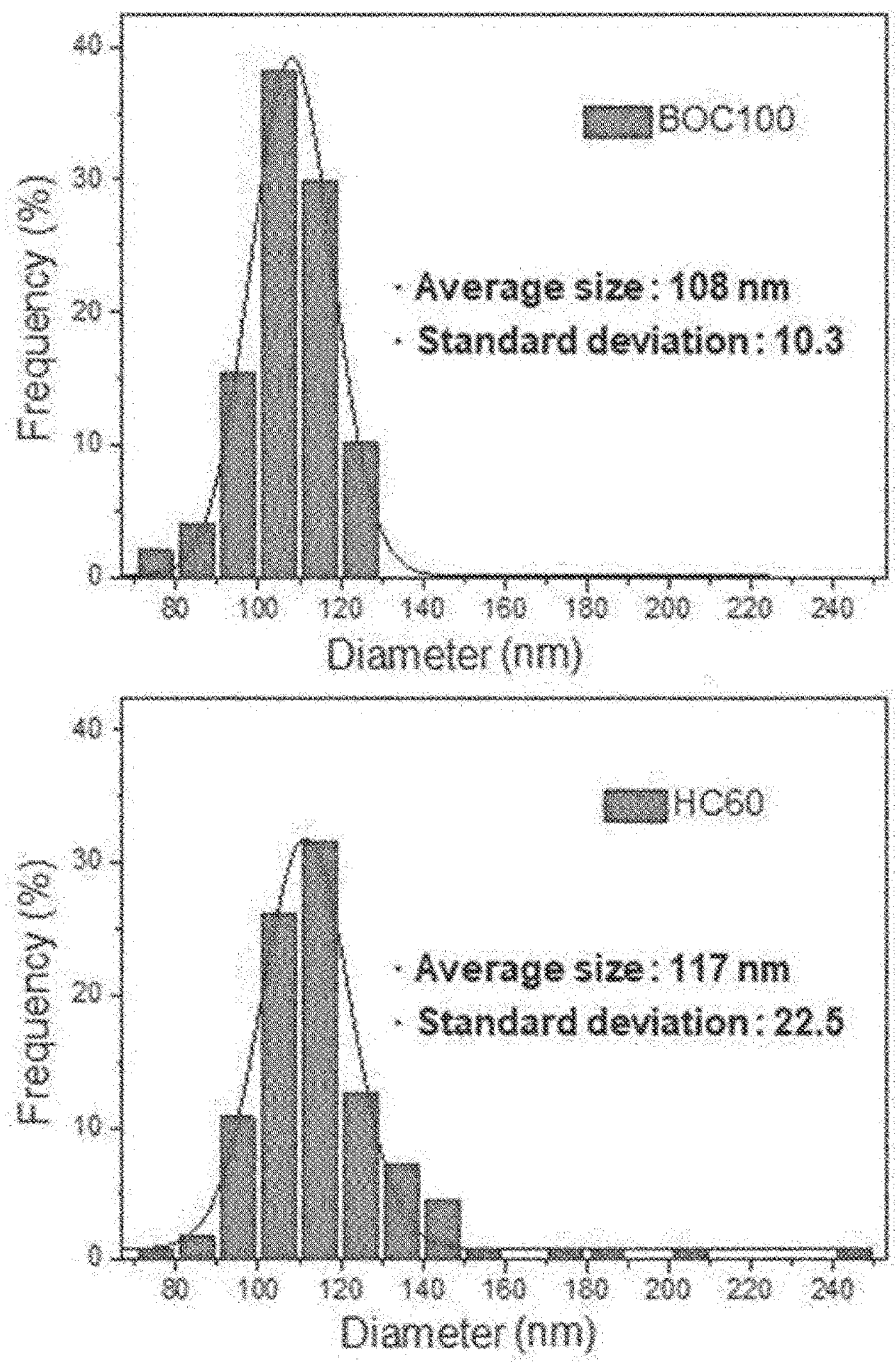
FIG. 4 is a histogram analyzing the particle size distribution of $CeO_2$ particles of Example 1 and Comparative Example 1.

FIG. 4 is a histogram showing the particle size distribution of the ceria particles of Example 1 and Comparative Example 1. The average particle diameter of the ceria particle (BOC100) of Example 1 is 108 nm with the standard deviation of 10.3. The average particle diameter of the ceria particle (HC60) of Comparative Example 1 is 117 nm with the standard deviation of 22.5. The standard deviation of ceria particle (BOC100) of Example 1 is much smaller than that of the ceria particle (HC60) of Comparative Example 1, demonstrating that ceria particle of Example 1 exhibits mono-dispersity.

The ceria particle according to the present invention having the spherical appearance and mono-dispersity is more preferable in terms of decreasing defects, scratches or dishing flaws in CMP processing due to its smooth and round surface characteristics in the absence of pointed edges with sharp angles.

As shown in FIG. 1, the ceria particle according to Example 1 has quite unique surface because it is composed of tiny nanoparticles (particle diameter of about 4.4 nm). That is, the inorganic particle according to the present invention is formed by aggregation of nanoparticles or atomic units. In Example 1, $CeO_2$ atoms (0.54 nm) cluster to form nanoparticles (4.4 nm) and the nanoparticles cluster to form an inorganic particle (108 nm).

Figure 5:
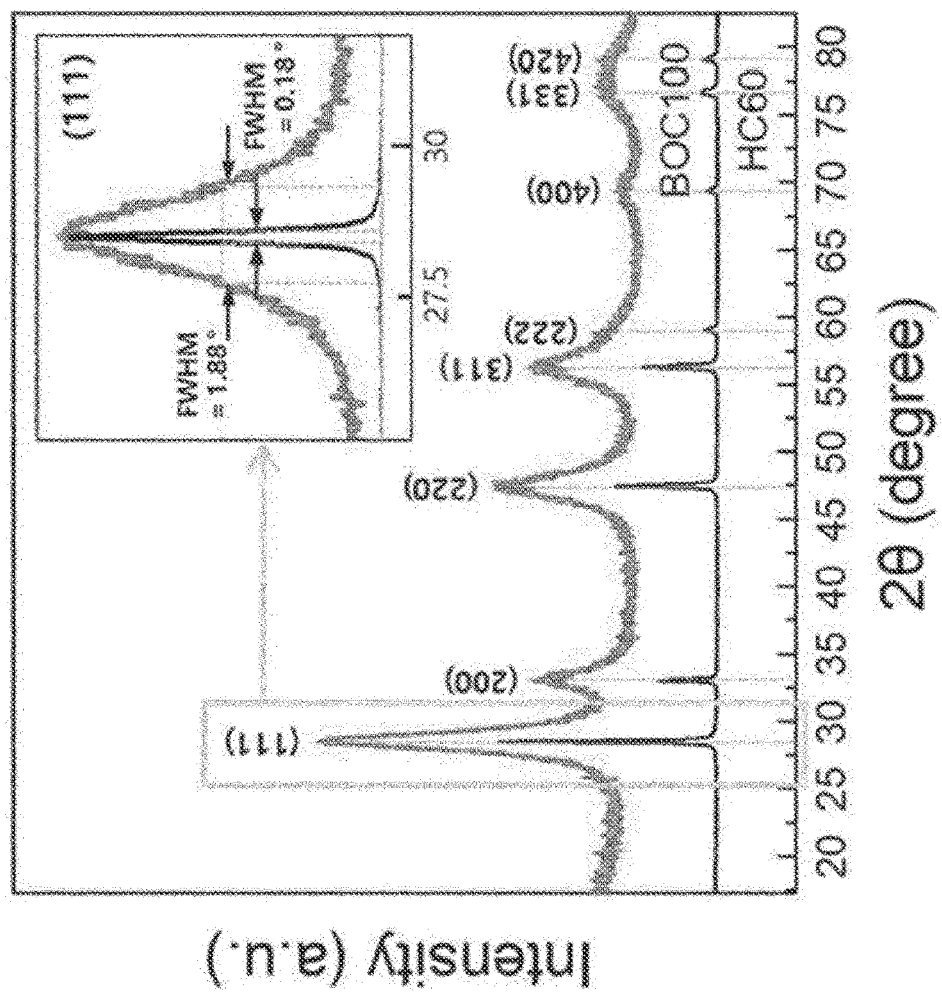
FIG. 5 is an XRD analysis result of $CeO_2$ particles of Example 1 and Comparative Example 1.

FIG. 5 is an XRD analysis result of $CeO_2$ particles of Example 1 and Comparative Example 1. Both particles show characteristic peaks of the fluorite crystals at 28.55°, 33.08°, 47.47, 56.33°, 59.08°, 69.4°, 76.7° and 79.07°, corresponding to the (111), (200), (220), (311), (222), (400), (331) and (420) lattice planes. However, the broadness of the peaks of the ceria particle (BOC100) of Example 1 demonstrates that. BOC100 has lower degree of crystallinity than that of the ceria particle (HC60) of Comparative Example 1.

In addition, for comparison of the crystal size, the (111) peak of XRD was chosen. The average crystal size (Lc) was calculated by the Scherrer equation using the full-width-of-half-maximum (FWHM) (Monshi, A., M. R. Foroughi, and M. R. Monshi, Modified Scherrer Equation to Estimate More Accurately Nano-Crystallite Size Using XRD. World Journal of Nano Science and Engineering, 2012. 02(03): p. 154-160).

$$L_c = \frac{K*\lambda}{\beta*\cos\theta} \quad \text{[Equation 1]}$$

where, $\lambda$ is the X-ray wavelength in nanometer (nm), $\beta$ is the FWHM in radians and $\kappa$ is a constant related to crystal shape (0.9).

The degree of crystallinity of the particle was calculated by the area under the XRD peaks using the Ruland-Vonk method (Iulianelli, G. C. V., et al., influence of TiO2 nanoparticle on the thermal, morphological and molecular characteristics of PHB matrix, Polymer Testing, 2018. 65: p. 156-162).

$$X_c(\%) = \frac{I_c}{I_c + I_a} \times 100 \quad \text{[Equation 2]}$$

where Ic is the sum e areas under the crystalline peaks and Ia is the area of the amorphous halo.

As summarized in Table 1, the crystal size (Lc) of the ceria particle of Example 1 is 4.4 nm and the degree of crystallinity Xc is 70.5%. The nanoparticle size (4.4 nm) shown in the schematic diagram of FIG. 1 is based on this XRD analysis.

TABLE 1

| | FWHM (degree) | Crystal size (nm) | Crystallinity (%) | d-spacing (Å) |
|---|---|---|---|---|
| BOC100 | 1.88 | 4.4 | 70.5 | 3.10 |
| HC60 | 0.18 | 45.5 | 95.8 | 3.12 |

In comparison, the particle of Comparative Example 1 has the crystal size (Lc)=45.5 nm and the degree of crystallinity (Xc)=95.8%. The crystal size of the particle of Example 1 according to the present invention is much smaller than that of the particle of Comparative Example 1 and the degree of crystallinity of the particle of Example 1 is much lower than that of the particle of Comparative Example 1. It indicates that there exists a substantial amount of amorphous phase ceria in the particles of the present invention. The amorphous phase is usually softer than the crystalline phase, which may well be favorable in the amelioration of scratches or dishing flaws in the CMP process.

Figure 6:
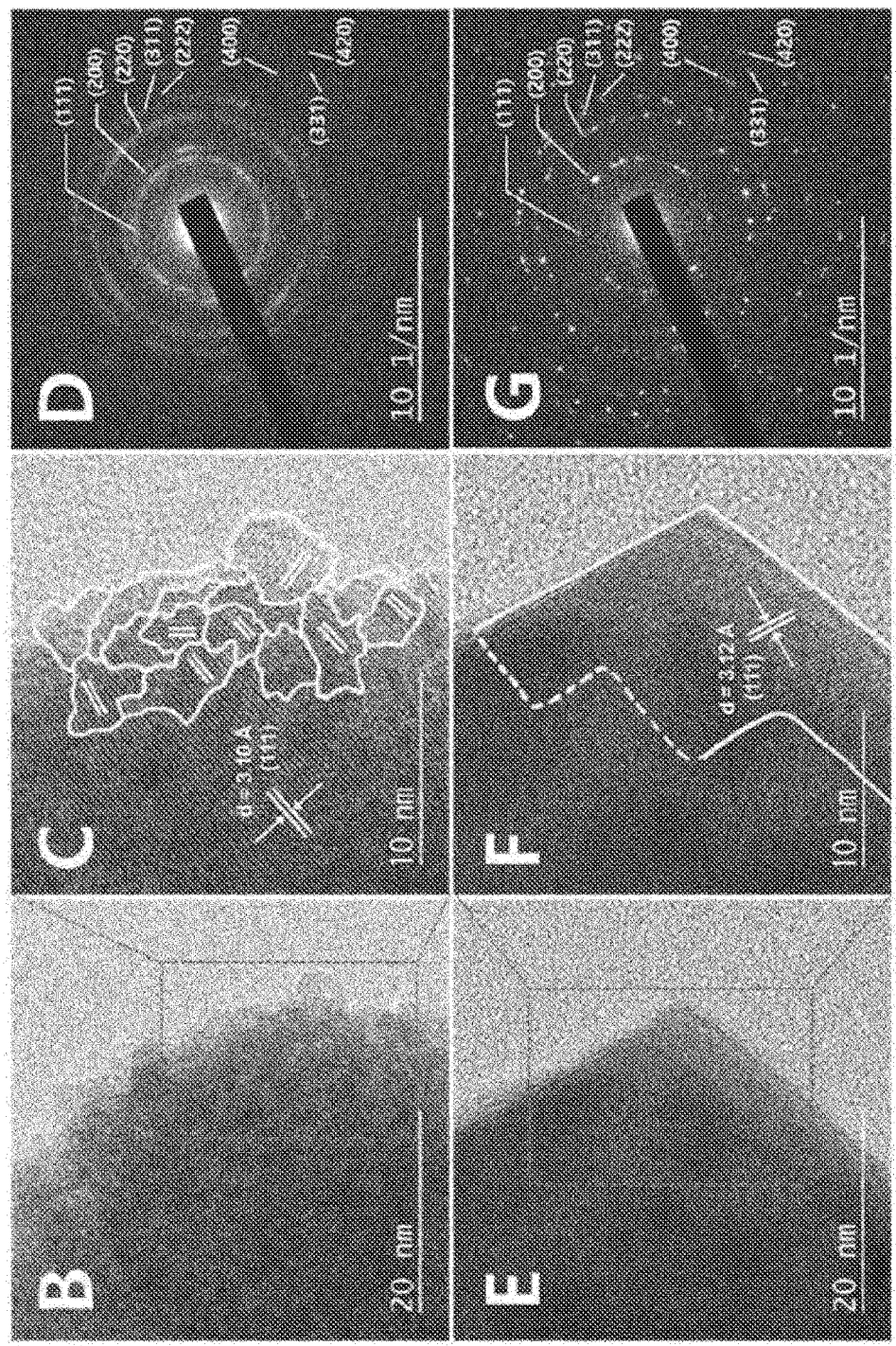
FIG. 6 shows HR-TEM images and selective area electron diffraction (SAED) patterns of $CeO_2$ particles according to Example 1 and Comparative Example 1.

FIGS. 6 (B) and (C) show HR-TEM images and the selected area electron diffraction (SAED) patterns. The particles of Example 1 show 3.10 Å d-spacing in the HR-TEM images, corresponding to the (111) lattice plane of ceria. In FIG. 6 (C), the size of resulting phase boundaries is in the range of 2 to 5 nm, which corresponds to the crystal size of 4.4 nm of FIG. 1. The diffused SAED patterns in FIG. 6 (D) also prove the particle of Example 1 is a mixture of crystalline and amorphous phases as represented by both spots and rings.

In comparison, as shown in FIGS. 6 (E) to (G), the particle of Comparative Example 1 shows a big crystalline phase represented by the (111) lattice plane in one direction enclosed by the boundary. It means that the particle of Comparative Example 1 is composed of almost one or two single-crystal phases, which is supported by the crystal size=45.5 nm and the degree of crystalline=95.8%.

Figure 7:
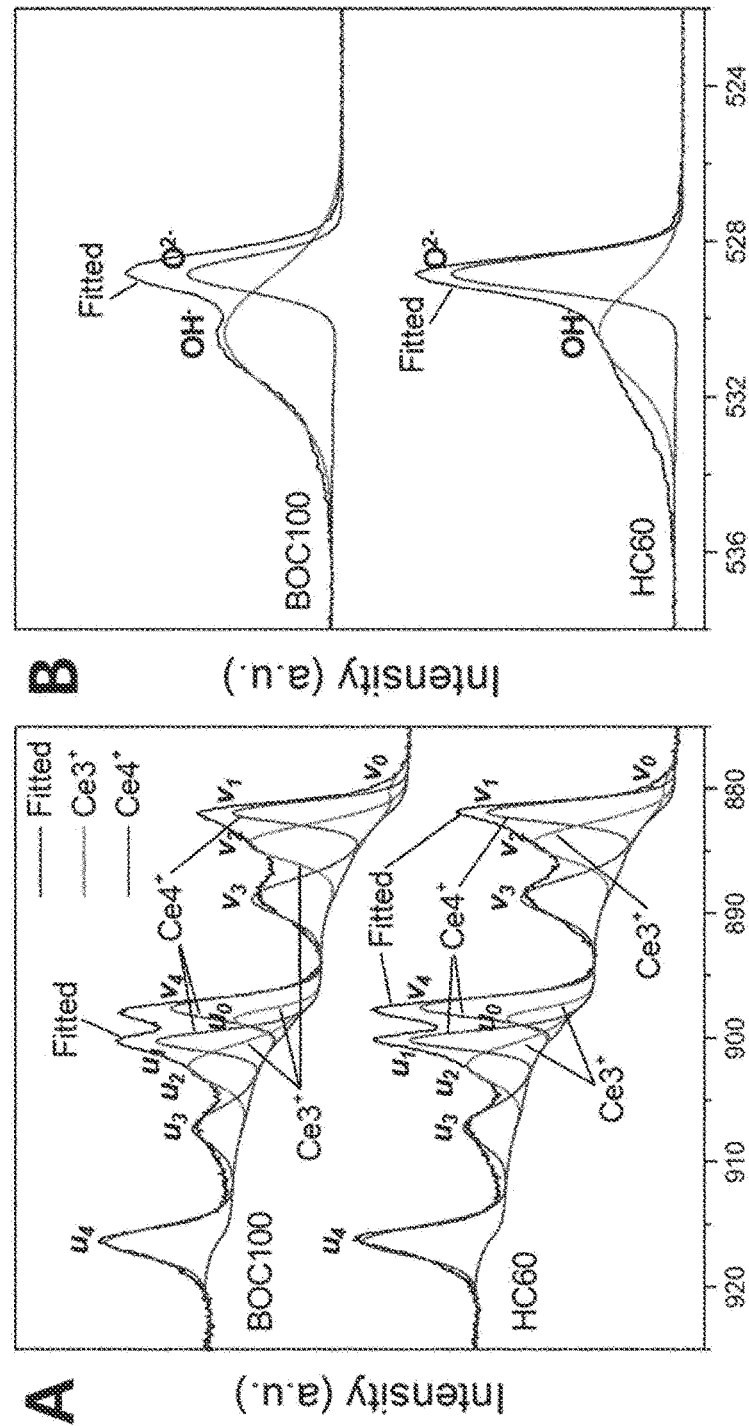
FIG. 7 is X-ray photoelectron spectroscopy (XPS) spectra of $CeO_2$ particles according to Example 1 and Comparative Example 1.

FIGS. 7 (A) and (B) show the results of elemental analysis of particles according to Example 1 and Comparative Example 1 focusing on Ce 3d and O 1s by X-ray photoelectron spectroscopy (XPS). FIG. 7 (A) shows that the Ce 3d peaks are splits into the Ce $3d_{5/2}$ and Ce $3d_{3/2}$ ionizations labeled as $v_0$, $v_1$, $v_2$, $v_3$ and $v_4$ belonging to the Ce $3d_{5/2}$ and as $u_0$, $u_1$, $u_2$, $u_3$ and $u_4$ belonging to the Ce $3d_{3/2}$, (Thromat, N., M. Gautier-Soyer, and G. Bordier, Formation of the CeY2O3 interface: an in situ XPS study, Surface science, 1996, 345(3): p. 290-302). $v_0$, $v_2$, $u_0$ and $u_2$ peaks represent the characteristics of $Ce^{3+}$ ions, and $v_1$, $v_3$, $u_3$ and $u_4$ peaks represent the characteristics of $Ce^{4+}$ ions (Mang, C. and J. Lin, Visible-light induced oxo-bridged Zr IV—O—Ce III redox centre in tetragonal ZrO 2-CeO2 solid solution for degradation of organic pollutants, Physical Chemistry Chemical Physics, 2011. 13(9): p. 3896-3905).

The concentrations of $Ce^{3+}$ and $Ce^{4+}$ were calculated as follows.

$[Ce^{3+}] = v_0 + v_2 + u_0 + u_2$ $[Ce^{4+}] = v_1 + v_3 + v_4 + u_1 + u_3 + u_4$

Table 2 shows specific information of XPS peak assignments.

TABLE 2

| | Peak Assignment (%) | | | | | | | | | | | | Ratio | | |
|---|---|---|---|---|---|---|---|---|---|---|---|---|---|---|---|
| | Ce $3d_{3/2}$ | | | | | Ce $3d_{5/2}$ | | | | | O 1s | | $Ce^{3+}$ | $Ce^{4+}$ | $Ce^{3+}/Ce^{4+}$ |
| | $u_4$ | $u_3$ | $u_2$ | $u_1$ | $u_0$ | $v_4$ | $v_3$ | $v_2$ | $v_1$ | $v_0$ | | | | | |
| | $Ce^{4+}$ | $Ce^{4+}$ | $Ce^{3+}$ | $Ce^{4+}$ | $Ce^{3+}$ | $Ce^{4+}$ | $Ce^{4+}$ | $Ce^{3+}$ | $Ce^{4+}$ | $Ce^{3+}$ | $OH^-$ | $O^{2-}$ | (%) | (%) | (%) |
| Binding Energy (eV) | 916.28 | 907.08 | 902.08 | 900.18 | 898.38 | 897.53 | 888.68 | 884.23 | 881.83 | 879.88 | 530.33 | 528.83 | | | |
| BOC100 | 13.3 | 6.99 | 10.2 | 9.35 | 4.60 | 12.6 | 11.4 | 16.0 | 13.7 | 1.72 | 69.4 | 30.6 | 32.6 | 67.4 | 48.4 |
| HC60 | 14.7 | 7.35 | 8.94 | 10.1 | 4.39 | 13.4 | 12.0 | 13.8 | 14.2 | 1.13 | 47.3 | 52.7 | 28.3 | 71.7 | 39.5 |

According to the above results, the calculated concentration of $Ce^{3+}$ of the particle according to Example 1 is 32.6%, which is higher than 28.3% of the particle according to Comparative Example 1. In addition, the ratio of $Ce^{3+}/Ce^{4+}$ of the particle according to Example 1 is 48.4 and the ratio of $Ce^{3+}/Ce^{4+}$ of the particle according to Comparative Example 1 is 39.5, which demonstrate that the particle according to Example 1 contains more $Ce^{3+}$ ions than the particle according to Comparative Example 1.

In aqueous systems, the $Ce^{3+}$ ions on the surface of ceria particles promote the dissociation of $H_2O$, resulting in the formation of hydroxyl groups (OH groups) on the $CeO_2$ surface. These hydroxyl groups on the particle surface function as active sites as well as physical adsorption of other materials, particularly resulting in the formation of Ce—O—Si bonds in the CMP process.

The concentrations of OH groups on the particles according to Example 1 and Comparative Example 1 were determined by O 1s XPS analysis (see FIG. 7 (B)). The peak at 528.83 eV is assigned to the lattice oxygen ion $O^{2-}$ and the peak at 530.33 eV is assigned to the surface hydroxyl ion $OH^-$ (Van den Brand, J., et al., Correlation between hydroxyl fraction and O/Al atomic ratio as determined from XPS spectra of aluminium oxide layers. Surface and Interface Analysis: An International Journal devoted to the development and application of techniques for the analysis of surfaces, interfaces and thin films, 2004. 36(1): p. 81-88).

The particle of Example 1 has 69.4% $OH^-$ on the surface, which is much higher than 47.3% OW of the particle of Comparative Example 1. Also, the particle of Example 1 has 30.6% $O^{2-}$ on the surface, which is much lower than 52.7% $O^{2-}$ of the particle of Comparative Example 1. This result is consistent with the fact that the particle of Example 1 has a much higher concentration of $Ce^{3+}$ ions on the surface than the particle of Comparative Example 1. Therefore, it can be said that the concentration of $OH^-$ on the surface is proportional to the amount of $Ce^{3+}$ present. As a result, the particle of Example 1 has more Ce—OH active sites on its surface than the particle of Comparative Example 1, which is subsequently likely to accelerate the formation of Ce—O—Si bonding between $CeO_2$ particles and substrate in the CMP process.

Density

The density of $CeO_2$ inorganic particles according to Examples 1 and 2 and Comparative Examples 1 and 2 was measured by TAP densitometry (ASTM B527).

TABLE 3

|  | Density | Appearance |
|---|---|---|
| Example 1 | 3.6 g/ml | Uniform particle having spherical protrusion |
| Example 2 | 3.5 g/ml | Uniform particle having spherical protrusion |
| Comparative Example 1 | 3.4 g/ml | Angled shape |
| Comparative Example 2 | 3.2 g/ml | Amorphous shape |

Measurement of Zeta Potential

The zeta potential was measured using a zeta potential analyzer (Nano ZS) manufactured by Malvern.

Figure 8:
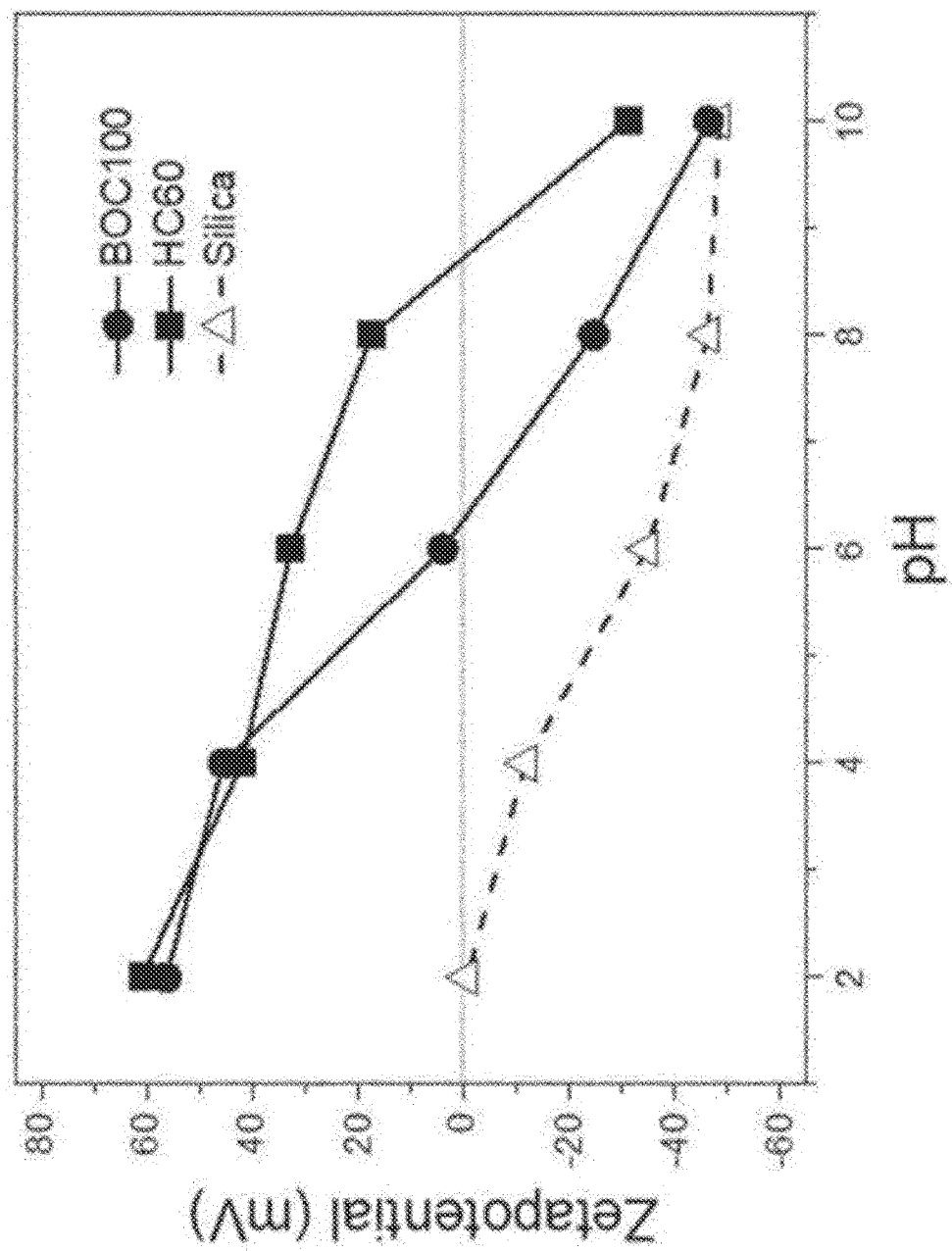
FIG. 8 is a zeta potential of $CeO_2$ particles according to Example 1 and Comparative Example 1 in aqueous dispersion.

FIG. 8 is a zeta potential of the dispersion of $CeO_2$ particles with spherical protrusions according to Example 1 after adjusting the pH of the dispersion to pH 2~10 using a nitric acid solution (acidic pH adjusting agent) and ammonia water (basic pH adjusting agent).

As shown in FIG. 8, the surface charge of the slurries of Example 1 and Comparative Example 1 shows a strong positive charge of about 60 mV at pH 2, and then shows weak positive charge with increasing pH. At pH 4 to 4.5 corresponding to the CMP operating conditions, both types of slurries have a zeta potential of >30 mV and represent a stable state of dispersion due to the electrostatic repulsion. Meanwhile, since the zeta potential of silica takes negative in a wide range of pH 2 to 10, particularly near pH 4, there are electrostatic attraction induced by opposite charges between silica substrate and ceria particle. The isoelectric points (IEP) of the particle of Example 1 and the particle of Comparative Example 1 in deionized water are approximately pH 6 and pH 9 respectively, seemingly due to the fact that the particle of Example 1 has a higher concentration of $OH^-$ as revealed in MCPS analysis.

Polishing Performance Test

Slurries were prepared in which each of the ceria particles of Example 1 and Comparative Example 1 was dispersed in deionized water at concentrations of 0.1, 0.2, 0.3, 0.4, 0.5, 0.6, 0.7, 0.8, 0.9, 1.0, 2.0 and 3 wt %, respectively, without other additives.

Figure 9:
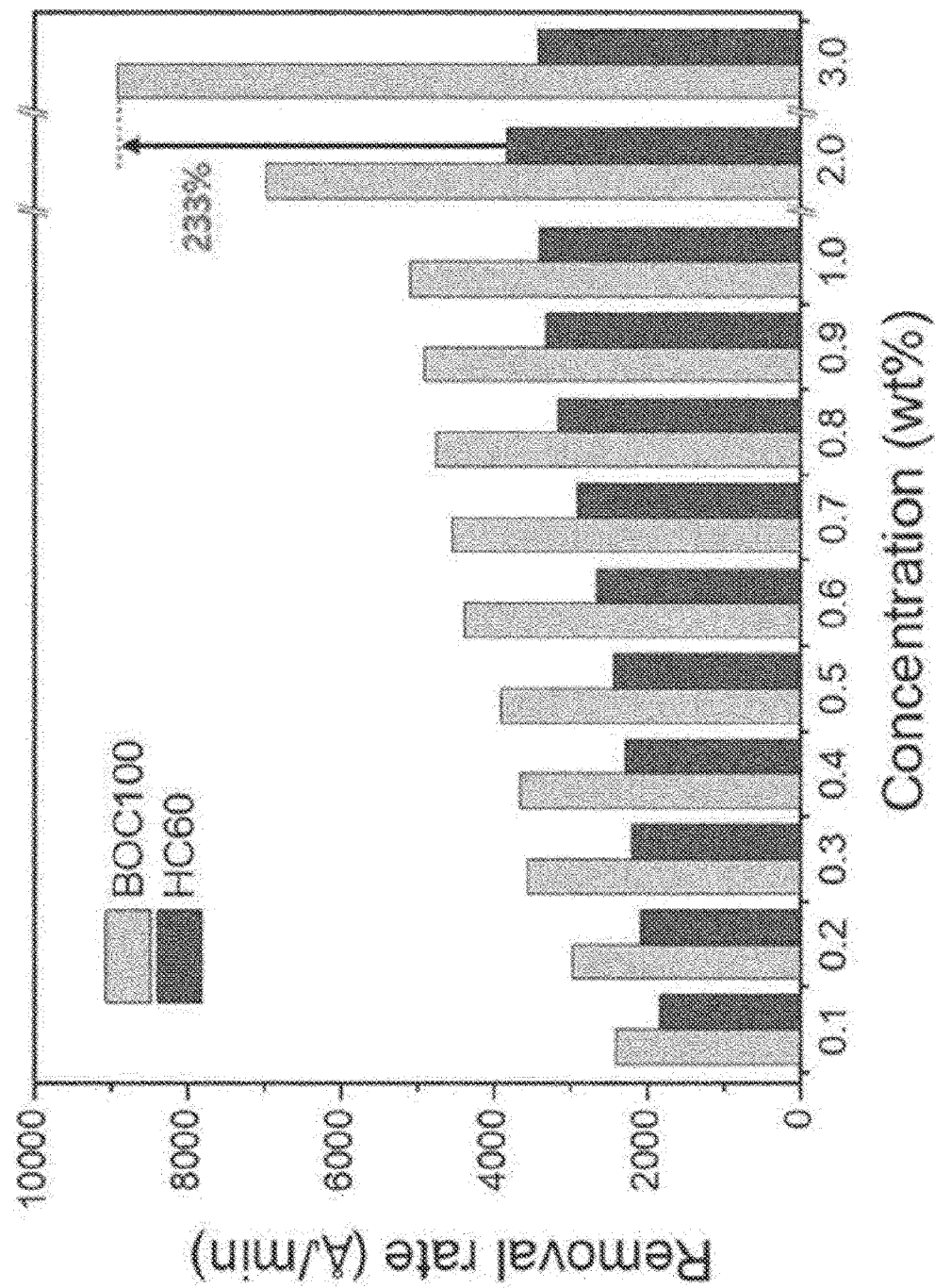
FIG. 9 is a comparison of the removal rates of the silicon film of the slurries of $CeO_2$ particles according to Example 1 and Comparative Example 1.

The CMP test was performed for 1 minutes using GnP POLI-400L under conditions of a slurry flow rate: 150 ml/min, and a fixed head pressure: 4 psi. The initial thickness of SiO2 on the bare wafer was 30,000 Å and the removal rate (RR) was measured using a refractometer (ST4000-DLX) (see FIG. 9).

It is known that the slurry containing the particles of Comparative Example 1 generally exhibits the highest polishing performance at a concentration of 0.3 wt %. Therefore, at the concentration of 0.3 wt %, the particle of Example gives RR=3546 Å/min and the particle of Comparative Example 1 gives RR=2197 Å/min.

The RR of the particle of Comparative Example 1 gradually increases with ceria concentration up to 2 wt % and drops at 3 wt %. The RR of the particle of Example 1 increases with increasing concentration, reaching 8904 Å/min at 3 wt %, which is 233% higher than the RR of the particle of Comparative Example 1 of 3823 Å/min at 2 wt %. From this, it can be seen that the active sites of the particle of Comparative Example 1 are saturated at around 2 wt %, but the active sites of the particle of Example 1 are not saturated even up to 3 wt %. This result is considered to be due to the high concentrations of $Ce^{3+}$ ions and $OH^-$ ions present on the surface of the particle of Example 1.

Figure 10:
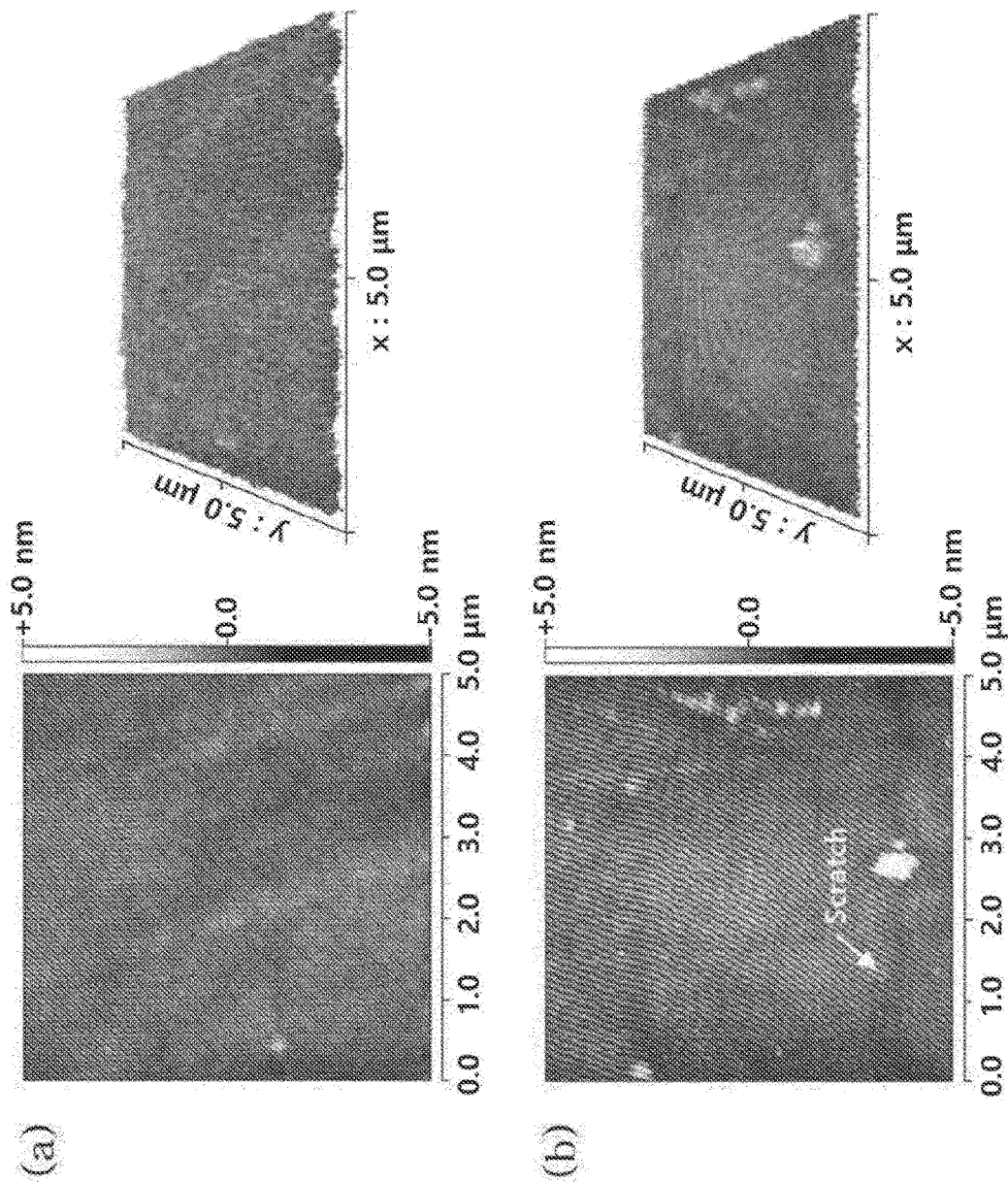
FIG. 10 atomic force microscope images of a wafer surface after CMP test using $CeO_2$ particles according to Example 1 (a) and particles according to Comparative Example 1 (b), respectively.

FIG. 10 shows atomic force microscope images of a wafer surface after CMP test using slurries in which 0.3 wt % of particles of Example 1 and Comparative Example 1 are dispersed in deionized water, respectively. In the CMP test using the slurry containing the particles of Comparative Example 1, it was found that deep and large scratch detects occurred on the wafer surface (FIG. 10 (b)) and a large amount of particles remained on the surface after the process. On the other hand, it can be seen that with the slurry containing the particles of Example 1, scratch defects did not occur on the wafer surface even after the CMP process and the amount of the remaining ceria particles was also remarkably small (FIG. 10 (a)).

According to the above results, it can be seen that the inorganic particles prepared by the method according to the present invention have a uniform size and efficiently controlled surface charge according to the pH. Moreover, as a result of CMP test using slurries, it was confirmed that polishing performance of the slurry containing the inorganic particles prepared by the method according to the present invention is superior to the slurry using commercially available fluorite hexagonal ceria particles, and at the same time has significantly reduced scratch defects on the wafer surface.

Although the above description has been focused on the embodiments of the present invention, various changes or modifications may be made at the level of those skilled in the art to which the present invention pertains. Such changes and modifications are considered to belong to the present invention as long as they do not depart from the scope of the technical spirit provided by the present invention. Accordingly, the scope of the present invention should be determined by the following claims.

The invention claimed is:

1. An inorganic particle formed by aggregation of a plurality of small particles, wherein the small particle has a mixed phase of a crystalline phase and an amorphous phase and has a degree of crystallinity of 90% or less, wherein the small particle has a particle diameter of 10 nm or less, wherein the inorganic particle is $CeO_2$ particle, and wherein the ratio of $Ce^{3+}/Ce^{4+}$ is 40 to 60.

2. The inorganic particle according to claim 1, wherein the inorganic particle has a density of 3.0 to 5.0 g/ml, an average particle diameter of 30 to 1000 nm, and a standard deviation of the particle diameter of 20 or less.

3. The inorganic particle according to claim 1, wherein the inorganic particle has an isoelectric point of pH 5 to 7.

4. The inorganic particle according to claim 1, wherein the inorganic particle has a zeta potential of +30 to +50 mV or −30 to −50 mV in an aqueous dispersion of pH 4.

5. A method of manufacturing the inorganic particle of claim 1, comprising:
 (a) dissolving a self-assembling surfactant in a solvent;
 (b) dissolving or dispersing an inorganic precursor in the solvent before, after, or simultaneously with the step (a) to prepare an inorganic precursor solution; and
 (c) forming small particles having a mixed phase of a crystalline phase and an amorphous phase in the shell formed by the surfactant through the self-assembly reaction of the inorganic precursor and the surfactant, and then forming an inorganic particle by aggregation of a plurality of the small particles.

6. The method of manufacturing the inorganic particle according claim 5, wherein the method further comprises treating the inorganic particle obtained in the step (c) with an acid and a base to obtain the inorganic particle having a controlled surface charge.

7. The method of manufacturing the inorganic particle according to claim 5, wherein the self-assembling surfactant is at least one selected from a cationic surfactant, an anionic surfactant and an amphoteric surfactant having a charge capable of ionically bonding with the inorganic precursor, which has a functional group that allows a condensation reaction or crosslinking reaction.

8. The method of manufacturing the inorganic particle according claim 7, wherein the functional group that allows a condensation reaction or crosslinking reaction is at least one selected from the group consisting of an amide group, a nitro group, an aldehyde group, and a carbonyl group.

9. The method of manufacturing the inorganic particle according to claim 5, wherein the self-assembling surfactant has a structure of the following formula 1

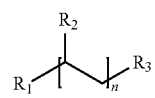

[Formula 1]

wherein $R_1$ and $R_3$ are independently a hydrogen atom, a $C_1$-$C_{10}$ alkyl group or a C1-C10 alkoxy group, $R_2$ is a substituent of formula 2 below, and n is 2 or more,

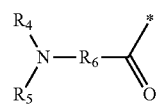

[Formula 2]

wherein $R_4$ and $R_5$ are independently a hydrogen atom, a $C_1$-$C_{10}$ alkyl group or a $C_1$-$C_{10}$ alkoxy group, $R_6$ is a $C_1$-$C_{10}$ alkylene group or a single covalent bond, and * represents a connection site.

10. The method of manufacturing the inorganic particle according to claim 5, wherein the solvent is water or a mixed solvent of water and a solvent having compatibility with water.

11. An aqueous dispersion in which the inorganic particles of claim 1 are dispersed in water.

12. The aqueous dispersion according claim 11, wherein the aqueous dispersion is a slurry for CMP.

* * * * *